(12) United States Patent
Friedrich

(10) Patent No.: US 7,706,625 B2
(45) Date of Patent: Apr. 27, 2010

(54) TRILATERAL FILTER FOR MEDICAL DIAGNOSTIC IMAGING

(75) Inventor: Roland Friedrich, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 992 days.

(21) Appl. No.: 11/449,923

(22) Filed: Jun. 9, 2006

(65) Prior Publication Data

US 2007/0286519 A1   Dec. 13, 2007

(51) Int. Cl.
*G06K 9/40* (2006.01)

(52) U.S. Cl. .................. 382/260; 382/261; 382/308

(58) Field of Classification Search .......... 382/260, 382/205, 261, 308
See application file for complete search history.

(56) References Cited

U.S. PATENT DOCUMENTS

| | | | | |
|---|---|---|---|---|
| 4,542,459 | A * | 9/1985 | Riederer | 600/431 |
| 4,785,349 | A * | 11/1988 | Keith et al. | 375/240.23 |
| 4,887,306 | A * | 12/1989 | Hwang et al. | 382/261 |
| 5,303,045 | A * | 4/1994 | Richards et al. | 348/443 |
| 6,360,025 | B1 * | 3/2002 | Florent | 382/261 |
| 6,447,450 | B1 * | 9/2002 | Olstad | 600/437 |
| 6,532,264 | B1 * | 3/2003 | Kahn | 375/240.16 |
| 6,909,491 | B2 * | 6/2005 | Morton et al. | 355/38 |
| 7,266,255 | B1 * | 9/2007 | Wasserman et al. | 382/307 |
| 7,397,948 | B1 * | 7/2008 | Cohen et al. | 382/167 |
| 7,437,013 | B2 * | 10/2008 | Anderson | 382/261 |
| 2002/0094130 | A1 * | 7/2002 | Bruls et al. | 382/261 |
| 2005/0259738 | A1 * | 11/2005 | Horishi et al. | 375/240.16 |

OTHER PUBLICATIONS

Choudhury et al., The Trilateral Filter for High Contrast Images and Meshes, 2003, Eurographics Symposium on Rendering, unnumbered: 12 total pages.*

"Bilateral Filtering for Gray and Color Images," C. Tomasi and R, Manduchi; Proceedings of the 1998 IEEE International Conference on Computer Vision, Bombay, India; 8 pages.

* cited by examiner

*Primary Examiner*—Bhavesh M Mehta
*Assistant Examiner*—Dennis Rosario
(74) *Attorney, Agent, or Firm*—Brinks, Hofer, Gilson & Lione

(57) ABSTRACT

A sequence of medical images is filtered. The filtering adapts as a function of spatial closeness, similarity of display values, and temporal vicinity. The kernel weights are based on combined spatial and temporal considerations as well as similarity for trilateral filtering. The similarity is a function of time. The similarity may be between display values separated by time or space and time.

16 Claims, 4 Drawing Sheets

Picture elements in a temporal sequence with respect to the filtering kernel

Non recursive offline filter (finite impulse response, k temporal samples are considered)

Non recursive inline filter (finite impulse response, k+1 temporal samples are considered)

ns, systems and computer readable media for filtering a sequence of medical images. In one embodiment, the filtering adapts as a function of spatial closeness, similarity of display values, and temporal vicinity. The kernel weights are based on combined spatial and temporal considerations as well as similarity for trilateral filtering. In another embodiment, the filtering adapts as a function of the similarity of display values where the similarity is a function of time. The similarity may be between display values separated by time or space and time. The two embodiments may be used independently or together.

TRILATERAL FILTER FOR MEDICAL DIAGNOSTIC IMAGING

BACKGROUND

The present embodiments relate to filtering medical diagnostic images. Filtering reduces noise in medical diagnostic images by smoothing the image.

Medical images may be subject to various types of noise. For example, ultrasound images contain speckle due to the phased array imaging technique. As another example, X-ray fluoroscopy images may show quantal noise and intrinsic electronic semiconductor noise from the X-ray detector.

Filtering in the spatial or temporal domain may reduce noise. A kernel with fixed weights is applied to each pixel value of a medical image. The relative contribution of spatially or temporally adjacent pixel values is based on the fixed weights. Various kernels have been used. For a spatial example, a Gaussian kernel more heavily weights pixel values adjacent a selected location than spaced from the location. For a temporal example, infinite impulse response filtering using a fractional weight and the inverse of the weight combines image data from different times.

Adaptive filtering smoothes a medical image as a function of the data representing the image. Edges or structures may be better maintained with adaptive filtering. The weights of the kernel adapt as a function of the image data. For spatial filtering, the kernel adapts based on the distribution of the pixel or voxel values in the proximity of the pixel or voxel being processed. Examples include bilateral filtering using geometric closeness and similarity in pixel or voxel values. Each weight is a function of how close the kernel location is to the location being filtered and how close the display value of the kernel location is to the display value being filtered. However, noise at different times is not considered.

For temporal filtering, the fractional weight and the corresponding inverse adapt as a function of difference in display values at different times. For example, sliding weighted temporal averaging (e.g., GCM) responds to movement between images. If a given pixel or voxel value is sufficiently different from a pixel or voxel value in the same location at a different time, movement has occurred. The fractional weight or the inverse applied to the older or earlier in time image data is reduced, emphasizing the current image data. Blurring due to movement may be avoided. However, a constant geometry is assumed.

BRIEF SUMMARY

By way of introduction, the preferred embodiments described below include methods, systems and computer readable media for filtering a sequence of medical images. In one embodiment, the filtering adapts as a function of spatial closeness, similarity of display values, and temporal vicinity. The kernel weights are based on combined spatial and temporal considerations as well as similarity for trilateral filtering. In another embodiment, the filtering adapts as a function of the similarity of display values where the similarity is a function of time. The similarity may be between display values separated by time or space and time. The two embodiments may be used independently or together.

In a first aspect, a system is provided for filtering a sequence of medical images. A memory is operable to store at least first data of a first medical image. A filter is operable to determine a first similarity between a first value of the first data, the first value corresponding to a first location in the first medical image, and a second value of a second location in a second image. The second image corresponds to a different time than the first image, and the first location corresponds to a spatial offset from the second location. The filter is operable to weight a first contribution of the first value to a filtered result for the second value as a function of the first similarity.

In a second aspect, a method is provided for filtering a sequence of medical images. A photometric similarity is determined as a function of space and time. The sequence of medical images is filtered. The filtering adapts as a function of the photometric similarity.

In a third aspect, a computer readable storage medium has stored therein data representing instructions executable by a programmed processor for filtering medical images. The storage medium includes instructions for determining a filtered value from input data for the medical images, the filtered value determined as a function of geometric closeness, similarity in display values, and temporal vicinity.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A trilateral filter removes noise from medical images. The filtering adapts to combined spatial (geometric) closeness, photometric similarity, and temporal vicinity of image elements in a sequence of images. The similarity is based on temporal, spatial, or temporal and spatial derivatives or differences in display values. As the filtering extends in the temporal dimension, small parts of the image (e.g., only one or few pixels/voxels) can be denoised due to the fact that there is no need for photometric similar picture elements in the spatial vicinity of the current image. Moreover, within the bounds of the filtering kernel, elements displaced within the considered time period may be used for filtering (denoising) the processed picture element. Hence, the temporal similarity adaptation accounts for moving structures between images, so may contribute non-noise temporal information in filtering despite a substantial change in the display value at a given location.

Figure 1:
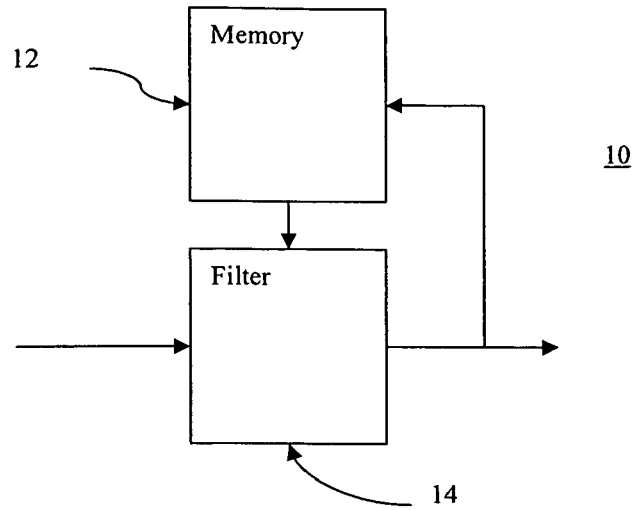
FIG. 1 is a block diagram of one embodiment of a system for filtering a sequence of medical images.

FIG. 1 shows one embodiment of a system 10 for filtering a sequence of medical images. The system 10 includes a memory 12 and a filter 14. The system 10 is a filter component, such as an analog or digital filter, or is part of a processor or computer, such as associated with an imaging system or workstation. Additional, different or fewer components may be provided. For example, another memory stores data initially input to the filter 14. As another example, the filter 14 includes the memory 12 or operates without a feedback memory loop, such as for finite impulse response filtering structures.

The memory 12 is a buffer, corner-turning memory, RAM, database, removable media, optical, cache, hard drive, combinations thereof, or other now known or later developed memory. The memory 12 stores data in a feedback from the filter 14. The data is previously filtered data, but may be data for an image passed through the filter 14 without filtering. In other embodiments, the memory 12 receives, from another memory, the image data associated with a prior or later time than currently filtered image data. In another embodiment, the memory 12 is positioned to input image data associated with different times to the filter 14, such as outputting image data to be filtered and image data from a past and/or later image.

The image data is in a display format, such as a Cartesian grid, or a non-display format, such as a polar coordinate grid. Image data or display values include data previously or currently used to display an image, data in a display (e.g., CRT or other viewer) format, or data not yet formatted or used for display. For example, image data or display values include data acquired in X-ray fluoroscopy but not processed to generate an image. The image data or display values may correspond to pixels or two-dimensional viewing planes or may correspond to three-dimensional volumes or voxels. The image data or display values may be black-and-white, color (e.g., RGB or YUV) or both black-and-white and color values. The image data represents an intensity, power, velocity, variance, energy or other detectable parameter for medical diagnostic imaging.

The memory 12 stores data for one or more medical images. The images are acquired as X-ray, X-ray fluoroscopy, computed tomography, magnetic resonance, positron emission, optical, ultrasound, combinations thereof or other now known or later developed modes. The images form a real-time sequence acquired in real-time or temporally spaced apart over a period. The images may be for a non-real time sequence, such as selectively combining images acquired at different times or even for different examinations.

The filter 14 is a processor, digital signal processor, application specific integrated circuit, field programmable gate array, digital circuit, analog circuit, combinations thereof or other now known or later developed device for filtering. The filter 14 is programmable, such as allowing changes in the functions used for spatial closeness, similarity, temporal vicinity, adaptation, or other filtering function. Alternatively, the filter 14 adapts without allowing adjustment to the adaptation process.

The filter 14 adapts based on a temporal based similarity of display values in one embodiment. In additional or alternative embodiments, the filter 14 is a trilateral filter which adapts contribution as a function of spatial closeness, a vicinity in time, and similarity (e.g., photometric similarity).

In one embodiment, the filter 14 operates as a programmed processor in response to instructions stored on a computer readable storage medium, such as the memory 12, a different memory or the filter 14. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, filter or system.

Figure 2:
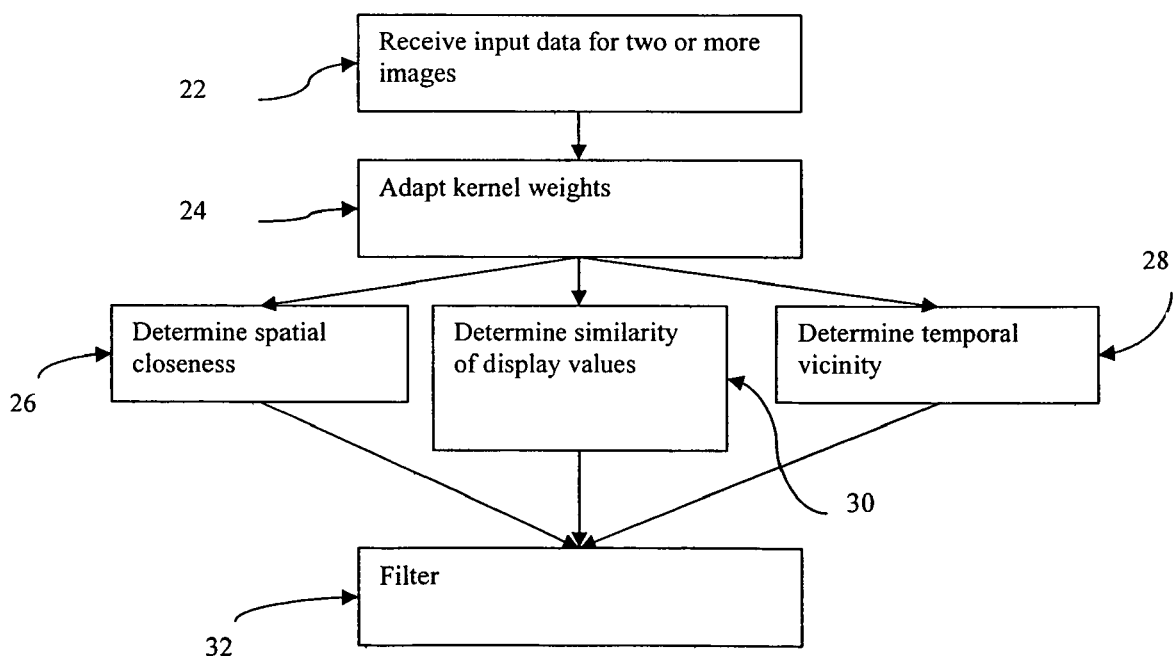
FIG. 2 is one embodiment of a flow chart diagram for filtering medical images.

FIG. 2 shows a method for filtering a sequence of medical images. The method is implemented using the system 10 of FIG. 1, the filter 14 of FIG. 1, or a different filter or system. Additional, different or fewer acts may be provided. For example, the similarity act 30 is performed with or without the spatial closeness act 26 and/or the temporal vicinity act 28. The acts are performed in the order shown or a different order. Acts shown in parallel (26, 28 and 30) may be performed sequentially, and acts shown sequentially may be performed in parallel.

In act 22, input data is received for two or more images. The sequence of images represents a same or similar region of a patient at different times. The input may be received sequentially, such as associated with real-time filtering or filtering as the images are acquired or loaded. Alternatively, the input is received from storage, such as associated with loading a previously acquired sequence of images in any order. For previously acquired data, images from before and/or after image data being currently filtered may be used for temporal adaptation or filtering.

The input data provided to the filter is all of the data of each image or only data associated with currently used portions. For example, X-ray fluoroscopy images are filtered with a kernel. The kernel may be a 5×5×2 or 5×5×3 kernel where the "2" or "3" dimension represents time. The kernel extends in space and time. 5×5×5×2 or 3 may be used for filtering a volume. Other symmetrical or asymmetrical kernel sizes may be used. Smaller (e.g., 3×3×T) or larger spatial kernels with any size temporal dimension may be used. Spherical, circular, square, cube or other regular or irregular kernel shapes may be used. The center or other position of the kernel defines the image or display value being filtered as a function of values at other locations within the kernel. The weights of the kernel are applied to the corresponding data to determine a weighted value. The weighted values are combined to determine a filtered value. The kernel or window is shifted to other values to determine other filtered values from the input data for the medical images.

Figure 3:
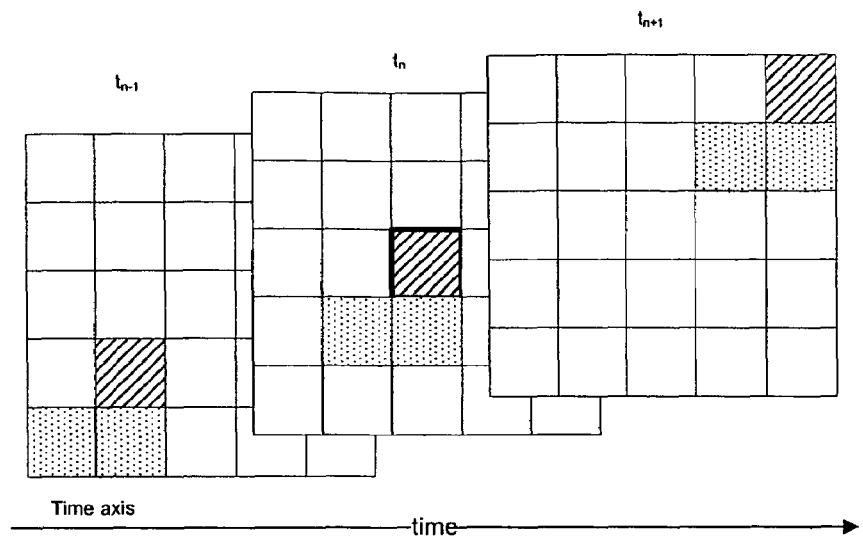
FIG. 3 shows a 5×5 pixel section of an image sequence consisting of 3 images (e.g., past, present, and future)

In one example of input data for filtering, FIG. 3 shows a 5×5 pixel section of an image at time $t_n$ for filtering a center pixel. The center pixel is shown surrounded by thick lines to highlight the pixel for description rather than reflecting data content. For non-recursive offline filtering and application of a 5×5×3 kernel, two additional 5×5 pixel sections of earlier, $t_{n-1}$ and later $t_{n+1}$ images are shown. For inline filtering, only a past and present or present with more than one past images are used. The patterns shown for each pixel represents signal level, so that similar patterns have similar signal levels.

The weights or contributions of different display values are defined by the kernel. The weighting contributions adapt to the input data in act 24. For example, the weights adapt to a similarity between the value to be filtered and a value associated with the kernel or weighting location. The filtering adapts as a function of the photometric or other similarity. As another example, the weighting contribution of each display value in the kernel adapts as a function of geometric closeness, the similarity and the temporal vicinity of each value within the kernel to a value to be filtered. The weights are fractional, integers, or other values above, at or below unity (1).

The filtered value may be determined as a function of a geometric closeness, a similarity in display values, and temporal vicinity. Contributions or weights are based on each consideration. Any linear or non-linear combination of weights for the different factors may be used. For example, weights are determined separately for closeness, similarity and vicinity. The weights for a given spatial location are averaged, but may be added, multiplied or otherwise combined. Other combination functions may be used, such as determining one weight from input functions (e.g., closeness, similarity and vicinity) without determining separate weights.

In act 30, the kernel weights or contribution of data in the filtering adapts as a function of similarity of display values. The similarity may correspond to range filtering or photometric similarity. Spatial, temporal or spatial and temporal similarity is used.

In one embodiment, the similarity between display values for medical images associated with different times is determined. For example, a display value to be filtered is at location x, y. The display value represents a 160 level of intensity or brightness in a possible range of 0-256. Other ranges may be provided. The same location in a subsequent or earlier image has a display value of 175. The difference between the display values is 15. One or more thresholds are applied to distinguish between similar and dissimilar values. For example, similarity may be a binary determination (e.g., a difference of 50 or greater is dissimilar) or may be graduated by steps or continuously using any linear or non-linear function. The weight to be applied to the display value (e.g., 175) of the subsequent or earlier image is determined based on the level of similarity. For example, larger weights are applied to more similar values.

For black-and-white or gray scale images, the weight may be a single value. For color images, the weight may be formed from multiple weights, such as one for each color component. Functions based on human perception of color similarity may be used for determining the weight or weights for color.

In one embodiment, the similarity is determined as a function of space and time. For example, a difference in intensity or color between geometrically different locations in different medical images of the sequence is determined. For example in a 3×3×2 kernel, 18 weights are provided for weighting 18 display values corresponding to 18 locations in space and time. Nine weights are for one image and nine weights are for the other image. The display value to be filtered is in the first or second image at the center of the 3×3 spatial extent, but may be off-center. The similarity is determined between the display values associated with different spatial locations in the medical images. In the example above where the value to be filtered is at the center of the first image, the similarity is determined between the value to be filtered and a display value of the second image at a non-spatially centered location. The similarity is between display values associated with different times and different spatial locations. A spatial offset by one or more pixels or voxels provides for the similarity as a function of space.

Since each kernel may define more than one spatial location in space and/or time, different similarities are determined for the different spatial locations. For example, a first difference in intensity or color between geometrically different locations in a same medical image of the sequence is determined, and a second difference in intensity or color between values of at least two of the medical images associated with different times is determined. Similarities for different locations and different times are determined. Similarities for different locations at a same time are determined. Similarity determinations are made for each location associated with the kernel, but may be determined for a sub-set of all of the locations, such as only determining for locations associated with different times.

The weights based on the similarity are used to weight a contribution of the display values to a filtered result. For each location defined by the kernel, weights provide the relative contribution. The contribution is a function of similarity of the pixel or voxel values in time and/or space to the display value being filtered. The weighted display values are used to determine a filtered display value. The similarities are determined again as the kernel is repositioned in time and/or space to filter a different display value.

The weights of the kernel are alternatively or additionally determined as a function of spatial closeness or domain filtering in act 26. The weight is based on the geometric closeness of the location to the location represented by the display value to be filtered. For example, a distance between the location of the display value to be filtered and the location in the kernel is determined. Other functions than actual distance may be used, such as different ranges.

A nonlinear or linear function is used to determine the weight based on the geometric closeness. Where the kernel is of a known size with display values having a predetermined distribution, the weights may be predetermined to account for distance, such as providing a Gaussian weight distribution. Euclidian or other geometric closeness functions may be used. Where the data varies in spacing, the kernel may have a set number or distribution of weights, but variable or differing distances. The geometric closeness adapts the weights as a function of the differing distances.

The weights of the kernel are alternatively or additionally determined as a function of the temporal vicinity in act 28. The temporal vicinity is a closeness in time. A temporal offset between two or more images is determined. Where the images in the sequence are evenly spaced in time and sequentially filtered, the temporal offset may be set or predetermined. Alternatively, the temporal offset varies with the image acquisition rate. Any linear or nonlinear function may be used to assign weights based on the temporal vicinity. Images closer in time may have a greater weighting or contribution to the filtered value and vise versa, but an inverse relationship may be used. A temporal vicinity could alternatively be defines as a certain moment in time or certain moments in time when the input image is expected to be in the main similar to the current image. As an example, for a periodic process recorded in the image sequence, images with a distance in time corresponding to the same phasing of the periodic process could be considered neighbors.

The images may be non-sequential, such as determining a temporal weight with one or more images at an intermediate time not included. For sequential or non-sequential images, the images used may have been acquired earlier and/or later in time.

Figure 4:
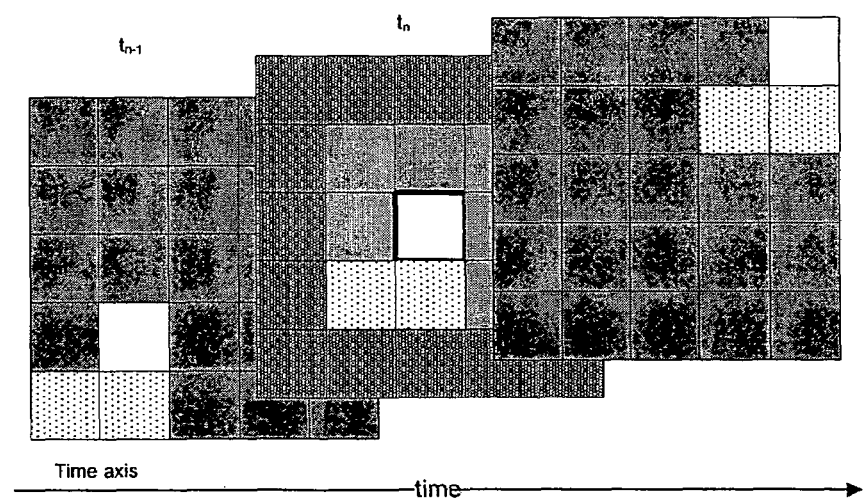
FIG. 4 shows the filtering kernel for the central pixel of the "present" section or image (see FIG. 3) where the "past, present and future" images are filtered in a non-recursive offline embodiment of the filter.
Figure 4:
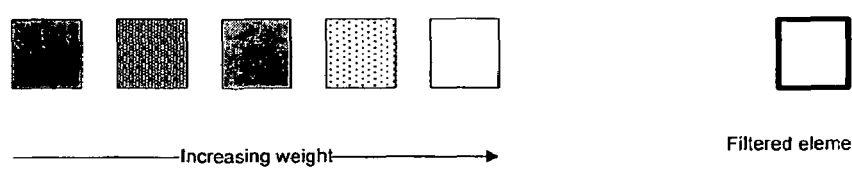

FIG. 4 shows the weights determined in one embodiment for filtering the input data shown in FIG. 3. The pixels shown have different shading or patterns to represent different weights for each pixel. The weight for the filtered element or pixel is the same as the weight of similar valued pixels, such as the far, upper right pixel in the later image or the near, lower left pixel in the earlier image. The weights of FIG. 4 represent the photometric similarity with additional weighting for spatial closeness and temporal vicinity. The closer in time weights of the present time $t_n$ have greater weighting in general than the weights for pixels at other times. The closer pixels in space for the image at the present time are shown in general with greater weights. The pixels associated with more similar pixel values are shown as having greater weight in general.

In act 32, the adapted kernel is used to filter the input data. For a given value to be filtered, the kernel weights the given value and/or other data. The weighting function is by multiplication. Other functions may be used, such as addition, subtraction, or combinations. The weighting adjusts the relative contribution of the data to the filtered result.

The weighted data is combined. For example, the weighted data is averaged (i.e., the filtering is a weighted average). Other combination functions may be used, such as addition, multiplication, subtraction, or combinations. The combined value is output as the filtered result.

The filtering is represented, in one embodiment, by:

$$h(x, y, t) = \frac{\int_{-\infty}^{\infty}\int_{-\infty}^{\infty}\int_{-\infty}^{\infty} f(x-\mu, y, v, t-\tau) c(x, y, u, v) l(t, \tau) s(f, (x, y, t), f(x-\mu, y-v, t-\tau)) d\mu dv d\tau}{k(x, y, t)}$$

where:

$$k(x, y, t) = \int_{-\infty}^{+\infty}\int_{-\infty}^{+\infty}\int_{-\infty}^{+\infty} c(x, y, \mu, v) l(t, \tau) s(f(x, y, t) f(x-\mu, y-v, t-\tau)) d\mu dv d\tau$$

and where f(x,y,t) is the input data for the sequence of medical images, c(x,y,µ,v) is the geometric closeness function with x and y indicating the location to be filtered and µ and v indicating the location for weighting, l(t,τ) is the temporal lag function between two or more images with t being a time for the value to be filtered and τ being a temporal offset for the value being weighted, and s(f(x,y,t), f(x−µ, y−v, t−τ)) is the similarity function in space and time.

For filtering a value located at x, y, t, the value at another location, µ, v and τ is weighted as a function of the geometrical closeness (c), the temporal vicinity (1) and the similarity (s). Any function may be used for determining closeness, vicinity and similarity. In alternative embodiments, fewer functions are used, such as weighting with the similarity function with or without the spatial closeness and/or temporal vicinity. The similarity function includes temporal and spatial components, but may include only one or the other.

For two and three dimensional images or data sets, multiple values are filtered. The kernel defines a window. The window is positioned at different locations for filtering different values. The weights are determined for each position. Similarity is a function of the data to be filtered and other data, so the weights are calculated for each window or kernel position. Alternatively, the weights may be used for multiple positions of the window. In one embodiment, the weight is associated with a location. Any use of the data at that location for filtering has the same weight. By repositioning the kernel, filtered values are determined for all or a sub-set of each image. One or more of the medical images are filtered.

Figure 5:
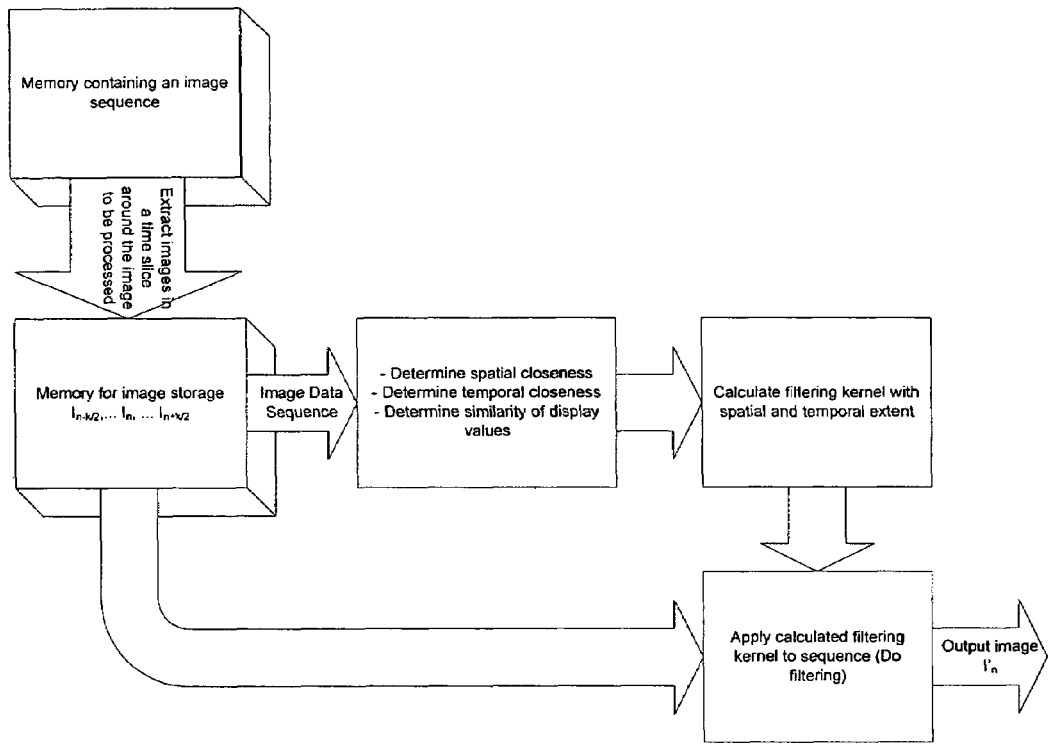
FIG. 5 shows one non-recursive "offline embodiment of the filtering (e.g., filtering with a finite impulse response).
Figure 6:
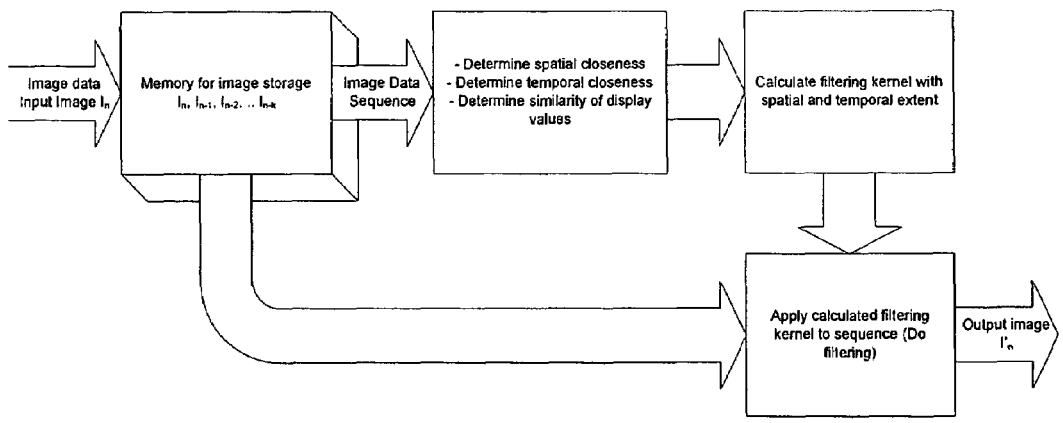
FIG. 6 shows one non-recursive "inline" embodiment of the filtering (e.g., filtering with a finite impulse response for real time image stream processing).
Figure 7:
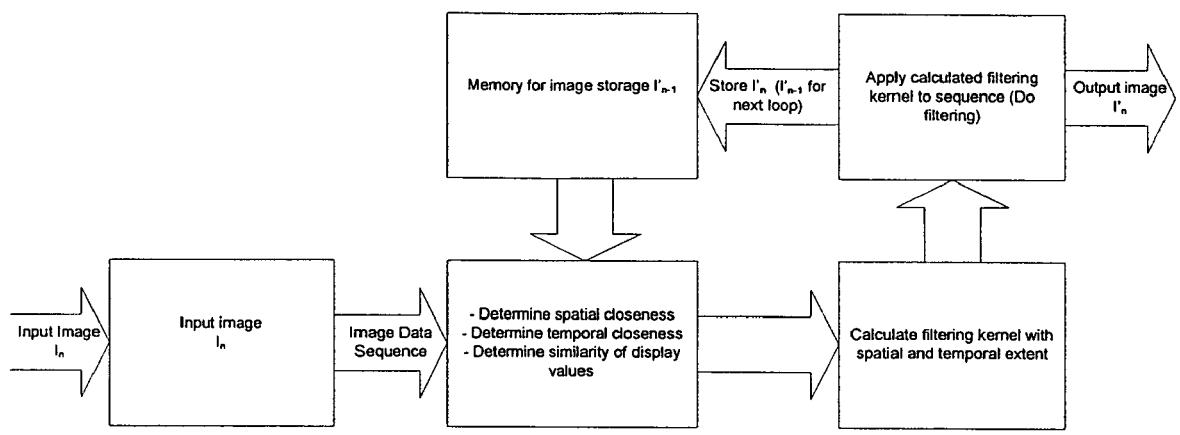
FIG. 7 shows one recursive "inline" embodiment of the filtering (e.g., filtering with an infinite impulse response for real time image stream processing).

FIGS. 5-7 represent different embodiments for filtering. FIGS. 5 and 6 show non-recursive filtering, and FIG. 7 shows recursive filtering. FIG. 5 shows filtering from stored data (e.g., "offline" filtering), and FIGS. 6 and 7 show filtering as data is acquired (e.g., "inline" or real-time filtering). In FIG. 5, images are extracted for the relevant time period from a memory containing an image sequence. Since the sequence is stored, images from before and after the image to be filtered are available for filtering. Each entire image is loaded or only a section of the desired images into another memory. Alternatively, a single memory is used. For each filtering operation, a particular number of images from different times are selected based on the temporal size of the kernel. Once the desired sequence of images for filtering is determined, the spatial closeness, temporal closeness and similarity are determined for the pixels within the kernel. The kernel weights are then calculated. The image pixel for a particular kernel is filtered and output. The process continues for each pixel location.

In FIG. 6, the images available for filtering include a present image and any previously acquired images. The images are selected from a buffer or other memory for filtering in an ongoing basis. Once the desired sequence of images for filtering is determined, the spatial closeness, temporal closeness and similarity are determined for the pixels within the kernel. The kernel weights are then calculated. The image pixel for a particular kernel is filtered and output. The process continues for each pixel location.

In FIG. 7, recursive filtering is used. The output or filtered data is fed back as an image. The present image is input. The most recent output image and the present image are used as the sequence for filtering, such as applying a kernel with the current input and current output images as representing two different times. The current output is a combination or influenced by all previous input images in recursive filtering. The spatial closeness, temporal closeness and similarity are determined for the pixels within the kernel. The kernel weights are then calculated. The image pixel for a particular kernel is filtered and output. The process continues for each pixel location.

By including both temporal and spatial similarity, the contribution of moving objects is included in the similarity function. Where the edge or other imaged structure alters position, such as due to patient movement, breathing, or heart motion, the filtering may better account for the edge or other structure with a spatial and temporal similarity. Temporal vicinity limits noise that may vary as a function of time. Spatial closeness limits noise that may vary as a function of space. Together, temporal vicinity, spatial closeness and similarity limit noise with spatial and temporal variation, including noise associated with shifting or moving structures.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for filtering a sequence of medical images, the system comprising:
   a memory operable to store at least first data of a first medical image; and
   a filter operable to determine a first similarity between a first value of the first data, the first value corresponding to a first location in the first medical image, and a second value of a second location in a second image, the second image corresponding to a different time than the first image, the first location corresponding to a spatial offset from the second location, the filter operable to weight a first contribution of the first value to a filtered result for the second value as a function of the first similarity.

2. The system of claim 1 wherein the filter, for each location in the second image, including the second location, weights contribution as a function of similarity of pixel or voxel value in time and space.

3. The system of claim 1 wherein the filter comprises a trilateral filter.

4. The system of claim 3 wherein the trilateral filter adapts contribution as a function of spatial closeness, a vicinity in time, and photometric similarity, the first similarity being one photometric similarity.

5. The system of claim 1 wherein the first and second medical images comprise X-ray fluoroscopy images.

6. The system of claim 1 wherein the filter is operable to determine a second similarity between the second value and a third value of the first data and is operable to weight a second contribution of the third value to the filtered result for the second value as a function of the second similarity.

7. The system of claim 1 wherein the filter is operable to determine a second similarity between the second value and a third value of a third location in the second image and is operable to weight a second contribution of the third value to the filtered result for the second value as a function of the second similarity.

8. The system of claim 1 wherein the filter is operable to determine a distance between the second value and a third value of a third location in the second image and is operable to weight a second contribution of the third value to the filtered result for the second value as a function of the distance.

9. The system of claim 1 wherein the filter is operable to determine a temporal offset between the first and second images and is operable to weight a second contribution as a function of the temporal offset.

10. In a computer readable storage medium having stored therein data representing instructions executable by a programmed processor for filtering medical images, the storage medium comprising instructions for:
    determining a filtered value from input data for the medical images, the filtered value determined as a function of a geometric closeness, a similarity in display values, and temporal vicinity;
    wherein determining the filtered value comprises applying a kernel extending in space and time and adapting each weight of the kernel as a function of the geometric closeness, the similarity in display values, and the temporal vicinity of a first location associated with the particular weight and a second location associated with the filtered value.

11. The instructions of claim 10 wherein determining the filtered value as a function of similarity in display values comprises determining the similarity between display values for medical images associated with different times.

12. The instructions of claim 11 wherein determining the filtered value as a function of similarity in display values comprises determining the similarity between the display values associated with different spatial locations in the medical images.

13. The instructions of claim 10 wherein determining the filtered value as a function of the similarity in display values comprises determining the similarity as a function of time and space.

14. The instructions of claim 10 wherein determining the filtered value comprises determining an X-ray image filtered value.

15. The instructions of claim 10 further comprising determining additional filtered values for other locations in one of the medical images, the additional filtered values responsive to different weights for a kernel, the different weights being a function of the geometric closeness, the similarity in display values, and the temporal vicinity of kernel locations associated with the different weights and a filtering location.

16. The instructions of claim 10 wherein determining from temporal vicinity comprises determining a temporal offset between first and second images.

* * * * *